United States Patent [19]

Rabson

[11] Patent Number: 4,562,385

[45] Date of Patent: Dec. 31, 1985

[54] PERIODIC RECIPROCATING MOTOR

[76] Inventor: Thomas A. Rabson, 4521 Ivanhoe, Houston, Tex. 77027

[21] Appl. No.: 542,634

[22] Filed: Oct. 17, 1983

[51] Int. Cl.$^4$ .............................................. H02K 41/00
[52] U.S. Cl. .................................... 318/135; 318/132; 310/14; 310/30
[58] Field of Search ................................. 310/12–14, 310/30; 318/135, 122, 123, 128, 132

[56] References Cited

U.S. PATENT DOCUMENTS

| | | | |
|---|---|---|---|
| 2,365,632 | 12/1944 | Fisher | 310/14 |
| 3,435,312 | 3/1969 | De Coster | 318/132 X |
| 3,548,273 | 12/1970 | Parodi et al. | 310/14 X |
| 3,611,783 | 10/1971 | Mittelmann | 310/14 X |
| 3,934,183 | 1/1976 | Saüfferer | 310/12 X |
| 4,068,152 | 1/1978 | Nakamura et al. | 310/126 |
| 4,234,831 | 11/1980 | Kemmer et al. | 310/12 X |

Primary Examiner—Donovan F. Duggan

[57] ABSTRACT

A reciprocating electric motor employs plural motor stator modules each including a group of coils selectively energized in subgroups to produce a magnetic field sweeping from one end of the group to the other and then repetitively from the same one end to the other always in the same direction until a number of ferromagnetic non-ferromagnetic armature sections each equal in length to the length of the stator modules and equal in number to the stroke of the motor divided by the length of each section has passed the stator module and thereafter the sequence of energization is reversed to move the armature a like distance in the opposite direction, the several coils of each group being electrically connected in a set each of which has its own power supply, the power supplies being collectively controlled by a microprocessor.

16 Claims, 12 Drawing Figures

TIME SEGMENT ~ COIL ENERGIZATION CHART

X = COIL ON

TIME SEGMENT

| COIL NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|---|---|---|---|---|---|---|---|---|---|---|---|---|
| 1 | X | X | X | X |   |   |   |   |   |   |   |   |   |   |   |   |   |   |   |   |   |   |   |   |   |   |   |   |   |   |   | X | X | X |
| 2 |   | X | X | X | X | X |   |   |   |   |   |   |   |   |   |   |   |   |   |   |   |   |   |   |   |   |   |   |   |   | X | X | X | X |
| 3 |   |   |   | X | X | X | X | X |   |   |   |   |   |   |   |   |   |   |   |   |   |   |   |   |   |   |   |   |   | X | X | X | X |   |
| 4 |   |   |   |   |   |   | X | X | X | X | X | X | X | X |   |   |   |   |   |   |   |   |   |   |   |   |   |   |   |   |   |   |   |   |
| 5 |   |   |   |   |   |   |   |   | X | X | X | X | X | X | X | X | X | X | X | X | X | X |   |   |   |   |   |   |   |   |   |   |   |   |
| 6 |   |   |   |   |   |   |   |   |   |   |   |   |   |   |   |   |   |   |   |   |   | X | X | X | X | X | X | X | X | X | X |   |   |   |

LENGTH AND SEQUENCE
OF TIME PERIODS

| COIL NO. | | | | | | | | | | |
|---|---|---|---|---|---|---|---|---|---|---|
| 1 | 1 | 3 | 3 | 3 | 7 | 3 | 3 | 3 | 3 | 2 |
| 2 | 2 | 5 | 3 | 5 | 3 | 3 | 3 | 3 | 3 |   |
| 3 | 3 | 3 | 3 | 3 | 3 | 3 | 3 | 3 | 5 | 4 |
| 4 | 1 | 3 | 3 | 3 | 7 | 3 | 3 | 3 | 3 | 2 |
| 5 | 2 | 3 | 3 | 3 | 3 | 5 | 3 | 3 | 3 | 3 |
| 6 | 3 | 3 | 3 | 3 | 3 | 3 | 3 | 3 | 3 | 4 |

OFF
ON

TIME PERIOD
SEQUENCE
FOR
FIELD COILS

NUMBERS
REPRESENT TIME PERIOD
(NUMBER OF TIME SEGMENTS)
A COIL IS ON OR OFF

Fig. 12

PERIODIC RECIPROCATING MOTOR

SUMMARY OF THE INVENTION

This invention relates to electric motors and more particularly to a reciprocating synchronous motor.

According to the invention a linear armature comprising a plurality of sections alternately of ferromagnetic and non-ferromagnetic material travels axially within and is reciprocated by a stator comprising a stack of coils. The coils are arranged in groups. There are a plurality of groups with the corresponding coils of each group being connected as a set for simultaneous energization. The sets are successively energized, several at a time, to produce a plurality of moving fields simultaneously to sweep the armature sections in one direction from one end toward the other. After one tandem sweep has been made and the armature moved one section length the sweep is repeated on the same direction to move the armature another section length. The tandem sweeps are repeated until the armature has moved the desired distance (stroke). Then the tandem sweeps are reversed to move the armature in the opposite direction a full stroke, completing one cycle. The cycle is repeated as long as desired.

The motor construction of the invention is in effect multi-modular in that by adding more stator coil groups the force may easily be increased, and by adding more coils per group and/or armature sections the stroke may easily be increased.

A construction of the motor adapting it to the geometry and environment at the bottom of an oil well is disclosed in applicant's proposed patent application entitled "In-Well Submersible Motor With Stacked Component Stator", copy enclosed herewith, the disclosure of which is incorporated herein by reference.

A construction of the motor and a pump for use in combination at the bottom of an oil well is claimed in applicant's comtemporaneously filed patent application entitled "Down Stroke Lift Pump for Wells".

A particular form of pump which may be driven by the subject electric motor and employed in a particular installation at the bottom of an oil well is claimed in the contemporaneously filed patent application of Danny Holm entitled "Dual Valve Well Pump and Installation".

BRIEF DESCRIPTION OF THE DRAWINGS

For a detailed description of a preferred embodiment of the invention reference will now be made to the accompanying drawings wherein.

As a matter of immediate clarification it may be noted that each stator unit or module includes a group of e.g. six coils sequentially energized in subgroups of e.g. 3 coils, and that the several coils in the group are each electrically connected, e.g. in series, with other like coils of other units of modules forming a set of coils all powered from a single separate power supply, the number of coils in the set being equal to the number of stator units employed in tandem, and the armature has multiple sections greater in number than the number of coils in each set (which is the number of coil groups) thereby increasing the motor stroke beyond that achieved by one coil group working on one armature section. Plural coils are used in a group to obtain long smooth thrust; plural coils are employed in a set to increase force, armature length in excess of stator length is employed to obtain extra long stroke.

DESCRIPTION OF PREFERRED EMBODIMENT

Overall Assembly

Figure 1:
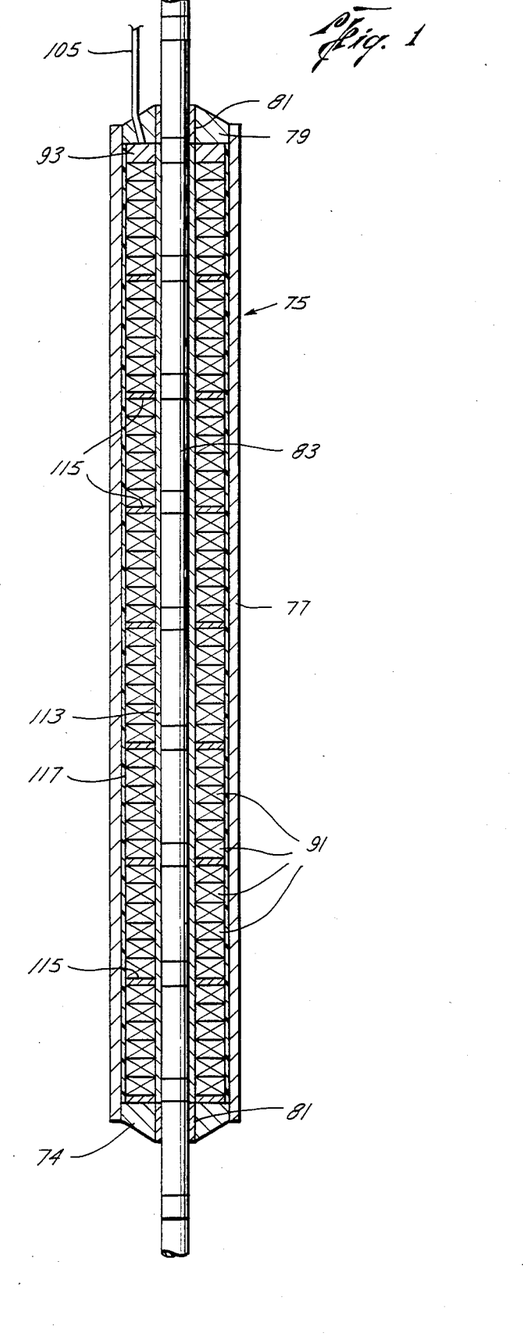
FIG. 1 is a vertical section through a motor embodying the invention.
Figure 2:
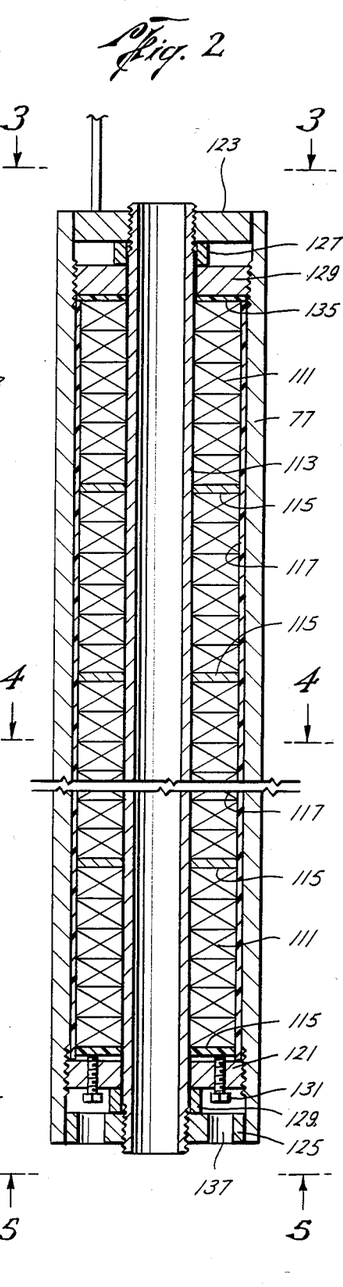
FIG. 2 is a vertical section through the motor stator.
Figure 3:
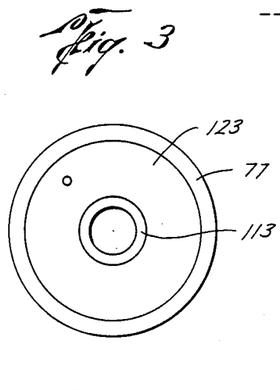
FIGS. 3, 4 and 5 are horizontal sections through the motor stator taken at planes 3—3, 4—4, and 5—5, indicated in FIG. 1.
Figure 4:
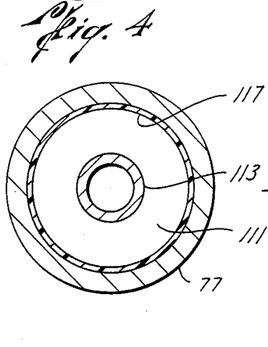
Figure 5:
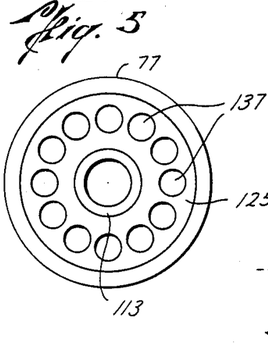

Referring now to FIG. 1, there is shown a reciprocating electric motor 75.

The motor includes lower out-board support 74 bolted or in other manner suitably releasably sealingly secured to tubular (preferably cylindrical) housing 77 of the motor. Upper out-board support 79 is likewise suitably bolted or otherwise releasably sealingly secured to the upper end of motor housing 77.

Within each of supports 74, 79 is a sleeve bearing such as shown at 81, providing means mounting motor armature or mover 83 for reciprocation coaxially with bearings 81 and housing 77.

The motor includes field windings 91 coaxial with motor housing 77 and the motor bearings and with armature 87. Above the field windings and below support 79 is power supply 93 contained within housing 77, whereby the motor has a self-contained power supply.

To the upper end of upper out-board motor support 79 is connected electrical conductor cable 105 for conducting electricity from the earth's surface down the well bore to motor power supply 93.

Motor Stator

Referring now to FIGS. 2–5 there is shown the stator of motor 75 of FIG. 1. As there shown, field winding 91 includes a plurality of solenoid coils stacked coaxially within motor housing 77 on a non-ferromagnetic support tube 113. The coils are stacked in groups of e.g., six, with an electrically insulating spacer ring 115 at the lower end of each group, each group constituting one motor stator module or unit. Each unit is coated with insulating tape or a layer of epoxy 117 to keep it out of electrical contact with housing 77, for the latter, being made of ferromagnetic material, is inherently somewhat electrically conducting and might short circuit the coils should their wire insulation fail, e.g., when the field winding is slid into the motor housing. On the other hand, support tube 113 is made preferably of a strong oil, water and corrosive resistant material such as stainless steel to protect against wear as the motor armature reciprocates therein, for despite the best seals, well formation fluid, which may be a sandy, sulfurous, oil-brine emulsion, may accumulate inside the motor.

The field winding, including the support tube and solenoids, is held in position within the motor by upper and lower threaded rings 119, 121 screwed into the ends of the housing and upper and lower threaded rings 123, 125 screwed onto the ends of the support tube, with bearing sleeves 127, 129 between the pairs of rings at each end of the motor housing. Set screws 131 extend through lower ring 121 and engage the lowermost bearing ring 115 to press the stack against electrically insulating junk ring 135 at the upper end of the stack just below threaded ring 119. Holes 137 are provided in lowermost ring 125 to allow tool access to set screws 131.

Motor Armature

Figure 6:
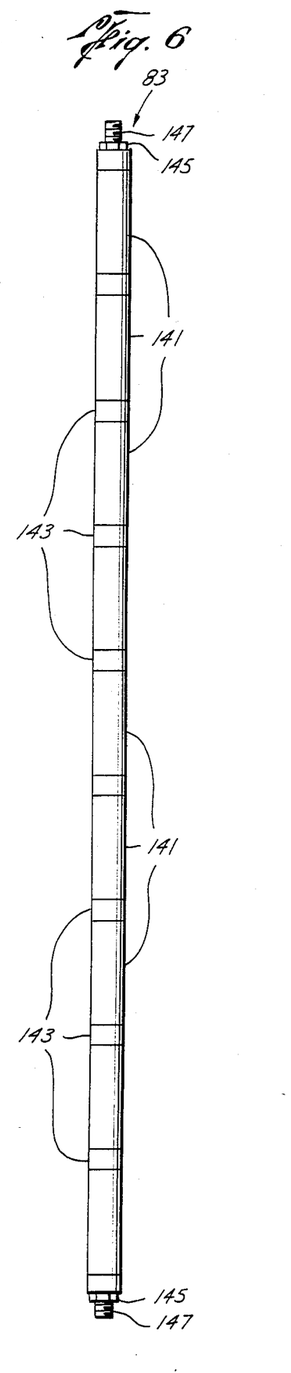
FIG. 6 is an elevation of the motor armature.

Referring now to FIG. 6, armature 83 comprises a plurality of long cylindrical sections 141 of ferromagnetic material separated by short cylindrical sections 143 of non-ferromagnetic material. These sections may be tubular and sleeved over a bar of non-ferromagnetic material and held in place thereon by nuts 145 screwed onto the threaded ends 147 of the rod, or they may be solid cylinders with pin and socket connectors at their ends which are screwed together.

The length of each armature module, comprising one ferromagnetic and one non-ferromagnetic section, equals the length of one stator module: The total length of the armature equals the length of the motor stator plus the stroke of the pump less the length of one armature module.

Figure 7:
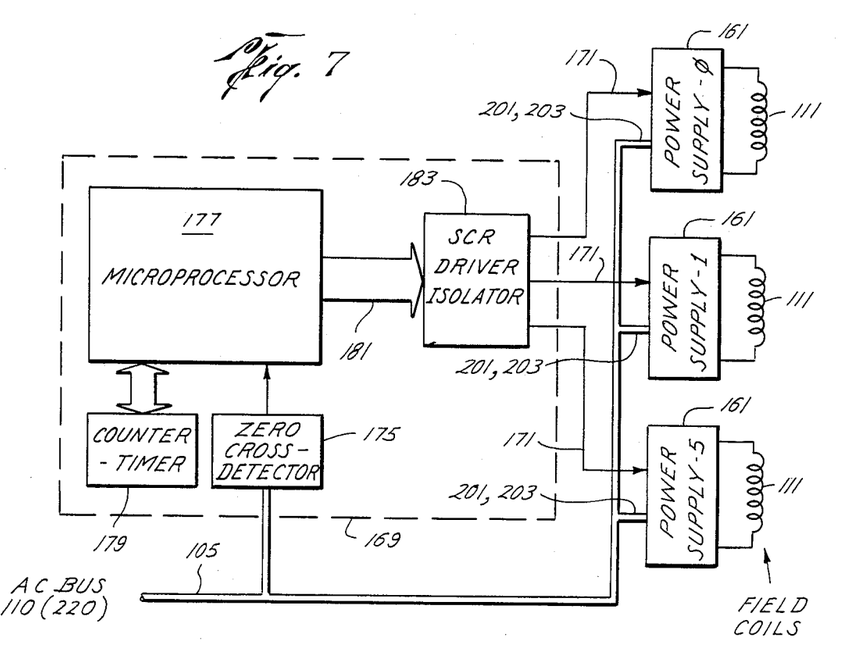
FIG. 7 is a block diagram of the control system of the motor.

Referring now to FIG. 7, there is shown in more detail the electrical power supply system. Control means 169 is seen to include a zero crossing detector 175 supplying electricity to a microprocessor 177 from cable 105, and an associated counter-timer 179. Microprocessor 177 has a plurality of parallel signal outputs 181, each of which connects to one of power supplies 161 through one set of electrical conductors 171.

Signals from microprocessor outputs 181 pass through isolator means 183 on their way to power supply discs 161 to prevent feedback from one set of field coils 111 from interfering with the signals to the power supply for another set of field coils. If desired, each power supply disc can be constructed to include its own isolator 183, eliminating the need for mechanically separate components for isolators 183.

It is to be understood that each of field coils 111 shown in FIG. 7 is in fact a plurality of field coils, one for each motor stator module, electrically connected, e.g. in series or in parallel or series parallel.

Figure 8:
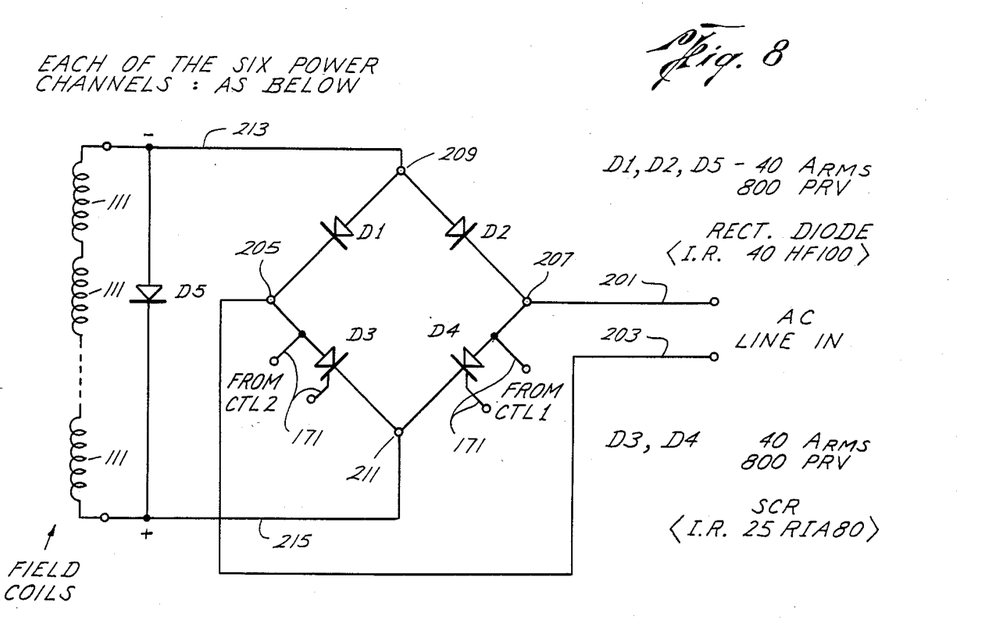
FIG. 8 is an electric circuit diagram for one of the individually controlled power supplies for one set of stator field coils.

Referring now to FIG. 8, there is shown the electric circuit for one of the power supplies. A pair of electrical conductors 201, 203 is connected to the single phase ac provided by cable 105. A bridge rectifier comprising diodes D1, D2, D3, D4 is connected to conductors 201, 203, the latter being connected to the diagonally opposite junctures 205, 207 of D1 with DC and of D2 with D4. The other diagonally opposite junctures 209, 211 between D1 and D2 and between D3 and D4 provide a unidirectional electric power output to a pair of conductors 213, 215 connected thereto. The negative electrodes of diodes D1 and D2 are connected to juncture 209 and their positive electrodes are connected to junctures 205; 207. The negative electrodes of diodes D3 and D4 are connected to junctures 205, 207 and their positive electrodes are connected to juncture 211, or all the polarities may be reversed from that shown.

The rectified electrical power supplied to conductors 213, 215 is connected to one of field coils 111 from each motor stator module, the field coils being shown to be connected in a series set, which minimizes the number of electrical conductors required, it being understood however that parallel or series/parallel connections may be employed if desired.

"Diodes" D3 and D4 are really SCRs (silicon controlled rectifiers) having control elements which impede the commencement of current flow on positive half cycles of the power supplied from conductors 201, 203 until the control elements have a zero of positive voltage impressed thereon: Signals from conductors 181 from microprocessor 179 are fed to control element input lines 171 of the SCRs. By controlling the point in the positive half cycle when the SCR fires the microprocessor controls the average current to the coil. Each field coil may be successively supplied with electric power for a number of half cycles or partial half cycles before the microprocessor discontinues electric power supply to the coil, and during the non-conductive half cycles and partial half cycles electric current in the field coils may continue to flow via diode D5 connected across lines 213, 215 (and hence across the field coils), as the magnetic fields of the coils try to collapse. The current in the field coils is therefore smoothed out to be fairly continuous dc so as to provide a greater motor efficiency and more uniform motor thrust and the other components are protected from the inductive voltage when the current cuts off.

Figure 9:
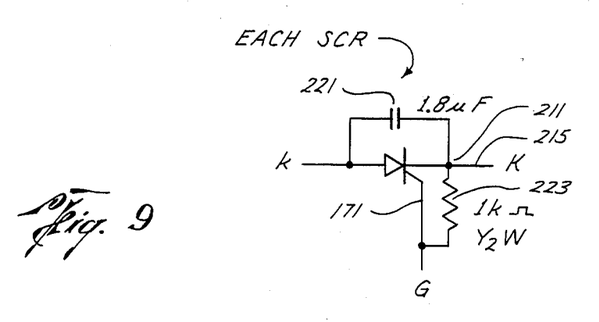
FIG. 9 is an electric circuit diagram of a suppressor incorporated in each of the power supply circuits.

Referring now to FIG. 9, there is shown further detail of each SCR circuit, which is seen to include a capacitor 221 across the SCR and a resistor 223 between the control element and positive electrode. The capacitor and resistor prevent spurious buildup of positive voltage on the control element and resultant SCR turn on at times other than when the microprocessor supplies a positive signal, such as might otherwise occur with parallel connected power supplies; although the capacitor may also prevent immediate turn-off this aspect does not seem to be detrimental.

Figure 10:
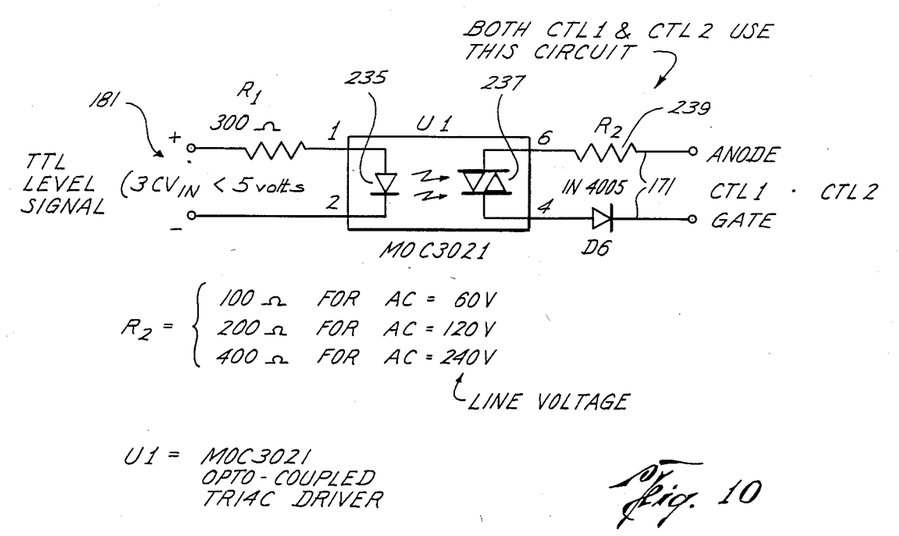
FIG. 10 is an electric circuit diagram for an isolator, such as isolator connecting each controller signal output with the respective one of the SCRs (silicon controlled rectifiers) of one of the power supplies.
Figure 12:
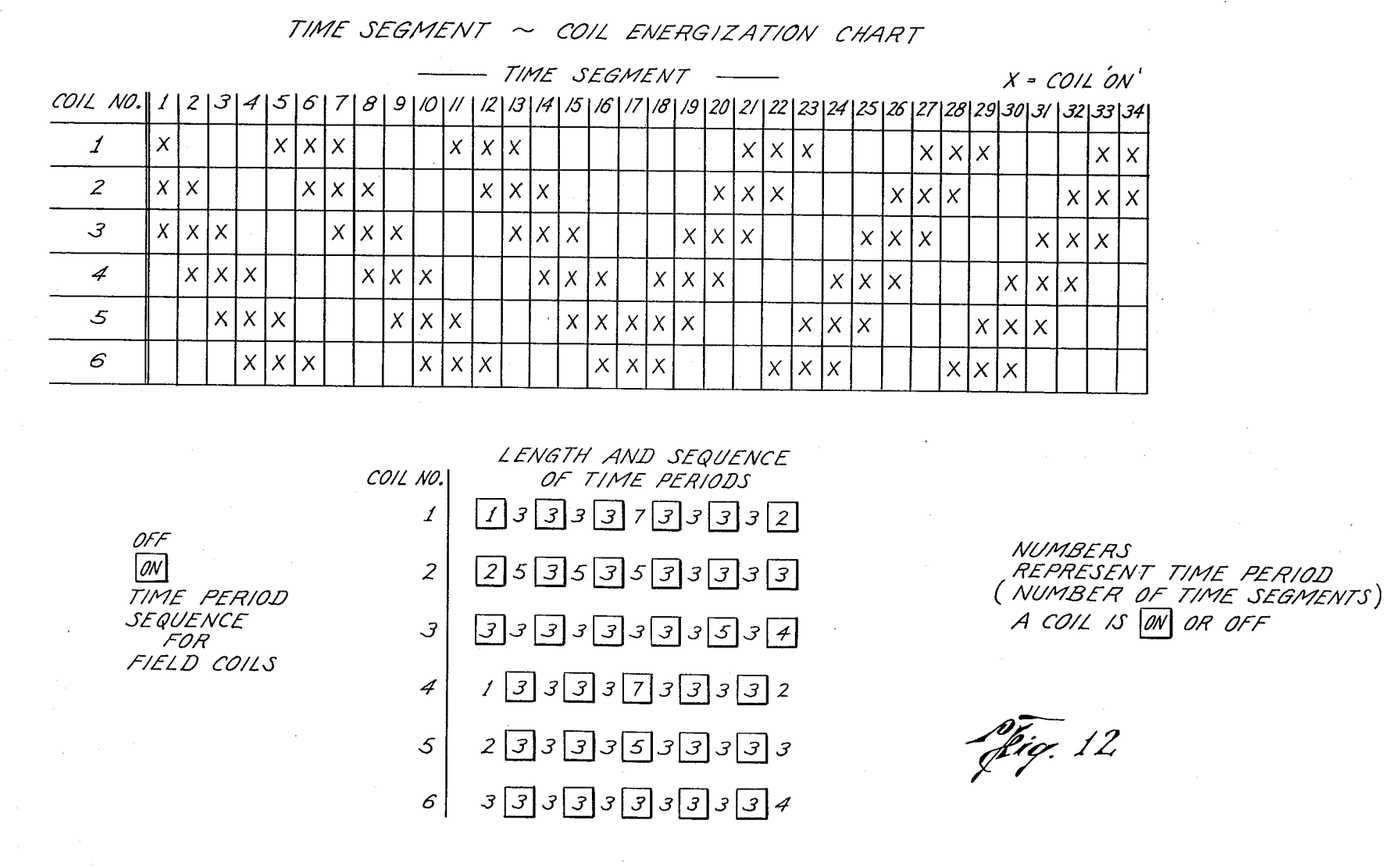
FIG. 12 is a drawing showing at the top a coil energization sequence chart for one group of the field energization coils, and at the bottom a chart of the off/on time period sequence for the field coils.

Referring now to FIG. 10, between each microprocessor output 181 and each SCR control element input 171 is an isolator 231 in the form of an opto-coupled triac driver, being an integrated circuit number MO C 3021 supplied by Motorola, or a Sigma AD32-1 as on page 337 of Catalog 105 of Newark Electronics, an enterprise of Premier Industrial Corporation, copyright 1981 by Newark Electronics, Chicago, Ill. 60624, printed in U.S.A. As there described, the opto isolator signal input is coupled by means of light to one, two or four mutually isolated photo-conductor cells. As shown in FIG. 12, input 181 energizes light emitting diode 235 and the light signals are picked up by photocell 237 and transmitted via resistor 239 and diode D6 to SCR control element input conductors 171.

Figure 11:
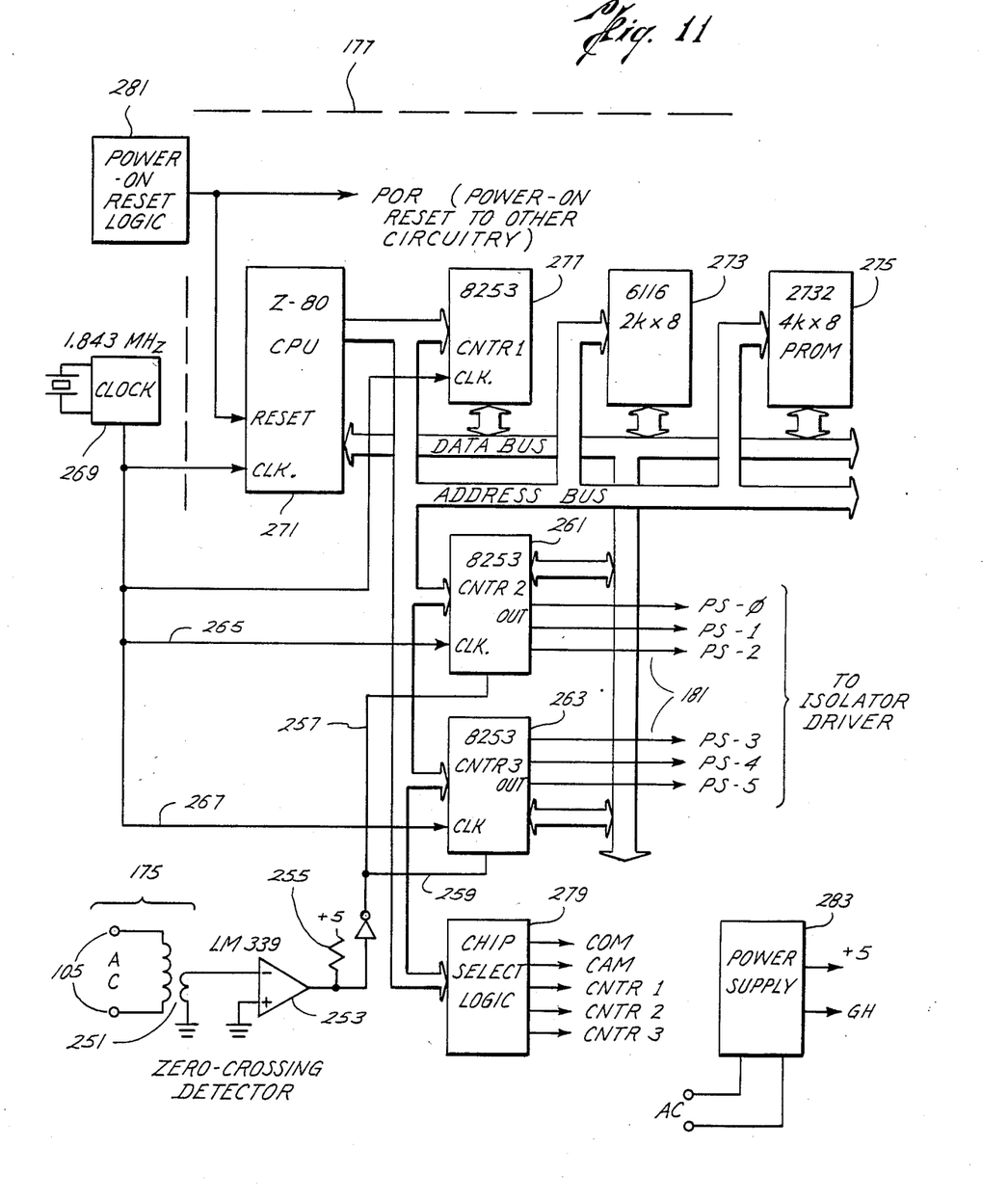
FIG. 11 is a logic diagram for the microcontroller of FIG. 9.

Referring now to FIG. 11, there is shown further detail of control means 169. Zero crossing detector 175 is seen to include transformer 251 connected to transistor 253 whose output develops a voltage across resistor 255. The commencement of a positive half cycle of the ac source from cable 105 is thus communicated via conductor 257, 259 to the trigger inputs of counters 261, 263. Counters 261, 263 are supplied with clock signals via conductors 265, 267 from high frequency (e.g. 1,843

MHz) quartz clock oscilliator 269. After a predetermined period determined by the settings of the counters they generate negative output signals delivered to conductors 181 leading to the opto isolators 231.

Counters 261, 263 are activated to be startable by trigger signals on conductors 257, 259 only when receiving a proper signal from central processing unit 271 which receives data from RAM 273 and PROM 275 and primary counter 277 and compares it with feedback from counters 261, 263. The processor 271 is connected to chip select logic element 279 to aid it in selecting which counter or memory chip it should select, and it is also connected to the power on reset logic element 281 to bring the system up in proper sequence after a power shut down.

Referring now to FIG. 12 the time sequence of full coil energization is shown. FIG. 12 at the top shows, for example, that field coil number 1 at the top of each motor stator module is energized during time segments 1, 5-7, 11-13, 21-23, 27-29, and 33-34, and deenergized the rest of the cycle, there being 34 time segments during one complete cycle of up and down strokes of the motor. Examining the sequence further with respect to FIG. 12, bottom part, it is seen that the coil is alternately on and off for periods of three time segments except for one long off period of seven time segments in the middle of the period. Similarly, the bottom coil number 6 is alternately off and on for periods of three time segments except for one long off period of seven time segments which occurs at the beginning and end of the cycle. Coil number 4 alternates on and off for three time segments except for a seven time segment on period at the middle of the cycle, whereas coil number 3 is alternately on and off for periods of three time segments except for a long seven segment on period at the beginning and end of the cycle. Coils 2 and 5 are alternately on and off for periods of three time segments except for long five segment on and off, or off and on, periods at the middle or at the beginning and end of the cycle respectively.

The effect of the foregoing time sequence of coil energization can best be appreciated with reference to FIG. 14 by considering the effect of the coil energization on a magnetic pole (of the armature) situated near coil 1 at tme segment number 1. When, at time 2 coil 2 is energized and coil 1 is not, the pole moves down to coil 2. Then at time 3, the pole moves down to coil 3 when coil 3 is energized and coil 2 is not. This continues at time 4. The pole moves down to coil 4 when coil 4 is energized and coil 3 is not. At time 5, the pole moves down to coil 5 when coil 5 is energized and coil 4 is not; the energization of coil 1 at time 5 does not affect the pole, which is too far away, but does begin to affect another pole farther up on the armature, pulling it down. At time 6 the first mentioned pole moves down to coil 6 when coil 6 is energized and coil 5 is not. At the same time, energization of coils 1 and 2 is causing the second mentioned pole to be pulled down (in conjunction with coil 6 of the next above module of the motor sector. At time 7 the first mentioned pole has moved beyond the realm of influence of coils 1 through 6 which now successively and conjointly operate on the second mentioned pole. A like situation exists at time 13, the coils beginning to act on a third pole of the armature and continuing to do so through time segments 14, 15 and 16. At time segment 17 things begin to change; coil number 4 remains energized and coil number 1 is not energized. The situation at times 16 and 17 is repeated at time 18. During times 16, 17 and 18, it may be assumed that the pole moves down further to coils 5 and 6. Thereafter at time 19, coil 6 is deenergized and coil 3 is energized, causing the pole to move up to coil 5, the lowermost coil of the group. In time segments 19-32 the armature continues to move up and then reverses in time segments numbers 33, 34 and 1. The motor stroke thus described has a length of three armature sections corresponding to three poles. For a longer stroke, a similar but longer cycle would occur.

Although in the foregoing discussion reference has been made to armature poles, in fact the armature sections are magnetized only by magnetic induction so that the neutral position of an armature section relative to an energized subgroup of field coils is with the midpoint of the armature section adjacent the midpoint of the subgroup of coils, corresponding to a minimum reluctance path for the magnetic field.

It should also be noted that there is no need to reverse the current in the various coils, nor the direction of magnetization of the armature, both preferably being in the same direction on motor upstroke as on downstroke.

While a preferred embodiment of the invention has been shown and described, modifications thereof can be made by one skilled in the art without departing from the spirit of the invention.

I claim:

1. Tandem periodic sweep reciprocating synchronous motor comprising:
   coaxial groups of coaxial coils, sets of corresponding coils in each group being connected for simultaneous electrical energizaton,
   an armature mounted for reciprocation coaxially within the coils including a plurality of elongate armature modules connected end to end, each armature module being of the same length, each armature module including alternate sections of ferromagnetic and non-ferromagnetic material, each ferromagnetic section being of the same length, each non-ferromagnetic section being of the same length,
   each of said groups of coaxial coils constituting a stator module, the distance between corresponding points on each group of coils of a stator module being equal to the length of one of said armature modules,
   each set of coils including a subgroup of coils from each of said groups of coils, each sub-group having an axial length greater than that of said non-ferromagnetic sections; and
   energization means for successively energizing each set of coils in timed sequence progressing along the axis of the coils repeatedly in one direction and then repeatedly in the opposite direction.

2. Apparatus according to claim 1:
   said energization means including for each set of coils a separate power supply means.

3. Apparatus according to claim 2, each power supply means comprising silicon controlled rectifier means.

4. Apparatus according to claim 3,
   said energization means further including a signal generator generating a plurality of separate signal sequences on a plurality of signal outputs, each signal output being connected to the control element of a different one of said silicon controlled rectifiers.

5. Apparatus according to claim 4,
   said energization means including opto-isolator means between each signal output and the respective rectifier control element to which it is connected.

6. Apparatus according to claim 4, said energization means including for each rectifier a false start suppressor means comprising a capacitor across the positive and negative electrodes of each said rectifier means and a resistor between each positive electrode and each control element of each said rectifier means.

7. Apparatus according to claim 4,
said energization means including a central processing unit operating on program data stored in its memory and data received from auxiliary counter means also included in said energization means to cause said counter means to generate said signal outputs.

8. Apparatus according to claim 2,
each power supply means comprising a full wave rectifier bridge formed by two plain diodes and two silicon controlled rectifiers.

9. Apparatus according to claim 3,
each power supply unit including bypass rectifier means connected across the output of the power supply unit in a direction opposing flow from the power supply unit but allowing flow in the reverse direction.

10. Motor according to claim 1 including a plurality n of said stator modules and a plurality n+s of said armature modules movable linearly within the stator modules, the force of the stator on the aramature being proportional to the number n of stator modules and the stroke being proportional to one plus the number s of armature modules exceeding the number of stator modules.

11. Motor according to claim 10
including coils in each stator module, one coil in each stator module being electrically connected with one coil in each other stator module to form a set.

12. Motor according to claim 11
said coils in each set being connected in series.

13. Linear motor according to claim 1, said stator modules producing a plurality n of reciprocating elongated magnetic fields each having a length x and a travel t and armature modules producing by magnetic induction from said stator modules a plurality n+s of elongated magnetic fields of length y where y is greater than x and equal to t.

14. Linear motor according to claim 1, said armature including a plurality n+s of said modules and said stator including a plurality n of said groups of coils including m coils in each group, and said energization means energizing electrically simulataneously a first subgroup of r coils of each group, where r is less than n, and then in like manner successively different subgroups of r coils of each group to produce a plurality n of magnetic fields each sweeping the length of one of the ferromagnetic sections of the armature from one end thereof to the other and then, after the armature has moved a distance equal to the length of one ferromagnetic section plus one non-ferromagnetic section sweeping the length of the next adjacent ferromagnetic section and then thereafter sweeping the length of successive next adjacent ferromagnetic sections until s+1 such ferromagnetic sections have been swept and then sweeping in reverse direction the previously swept sections to complete a sweep cycle and then repeating the sweep cycle $k = e/p$ times where e is the time the motor is on and p is the time period of each cycle.

15. Motor according to claim 14,
said energization means including for each set of coils rectifying means to rectify single phase alternating current of frequency f to uni-directional current comprising silicon controlled rectifier means whereby the output of the rectifying means can be turned on and off by application of signals to the control element means of the rectifier means, the rectifying means for each set of solenoids being sometimes turned on for time period p equal to c cycles of the alternating current where $c = (p)(f)$.

16. Motor according to claim 1 or 4,
said energization of the coils causing said armature to move first in one direction and then the opposite direction,
the direction of the magnetic field produced by the coils being in the same direction during motion of the armature in one direction as it is during motion of the armature in the opposite direction.

* * * * *